(12) United States Patent
Nagai et al.

(10) Patent No.: US 7,042,739 B2
(45) Date of Patent: May 9, 2006

(54) SWITCHING ELECTRIC SOURCE DEVICE

(75) Inventors: Jun Nagai, Hino (JP); Hitoshi Tsuji, Machida (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 183 days.

(21) Appl. No.: 10/859,545

(22) Filed: Jun. 3, 2004

(65) Prior Publication Data

US 2005/0041441 A1    Feb. 24, 2005

(30) Foreign Application Priority Data

Aug. 18, 2003  (JP)  .............. 2003-294469
Mar. 2, 2004   (JP)  .............. 2004-057786

(51) Int. Cl.
  *H02M 3/335*  (2006.01)
(52) U.S. Cl. .............. 363/21.06; 363/21.02
(58) Field of Classification Search ............. 363/20, 363/21.01, 21.02, 21.04, 21.06, 21.08, 21.14
  See application file for complete search history.

(56) References Cited

U.S. PATENT DOCUMENTS 6,061,255 A * 5/2000 Chik et al. .............. 363/21.06
6,295,214 B1 * 9/2001 Matsumoto et al. ..... 363/21.01
6,351,396 B1 * 2/2002 Jacobs .................... 363/21.06
2003/0048643 A1 * 3/2003 Lin et al. ................ 363/21.06
2005/0243481 A1 * 11/2005 Williams et al. .............. 361/18

FOREIGN PATENT DOCUMENTS

JP    2001-025245    1/2001

* cited by examiner

*Primary Examiner*—Matthew V. Nguyen
(74) *Attorney, Agent, or Firm*—Keating & Bennett, LLP

(57) ABSTRACT

A switching electric source device includes a first synchronous rectifier control circuit, which detects the resonance state developed based on the exciting energy of the primary winding after the main switching element switches off, and causes a first synchronous rectifier to switch on earlier during the time period from the completion of the resonance state to the switching on of the main switching element. Thus, the first synchronous rectifier switches on during the time period, and thus, current is prevented from flowing through a body diode, so that a voltage caused by the voltage drop in the body diode is prevented from being induced in the secondary winding and the third winding. As a result, variations in the output voltage, which is caused by the induced voltage of the third winding, can be prevented. The output voltage can be stabilized.

20 Claims, 11 Drawing Sheets

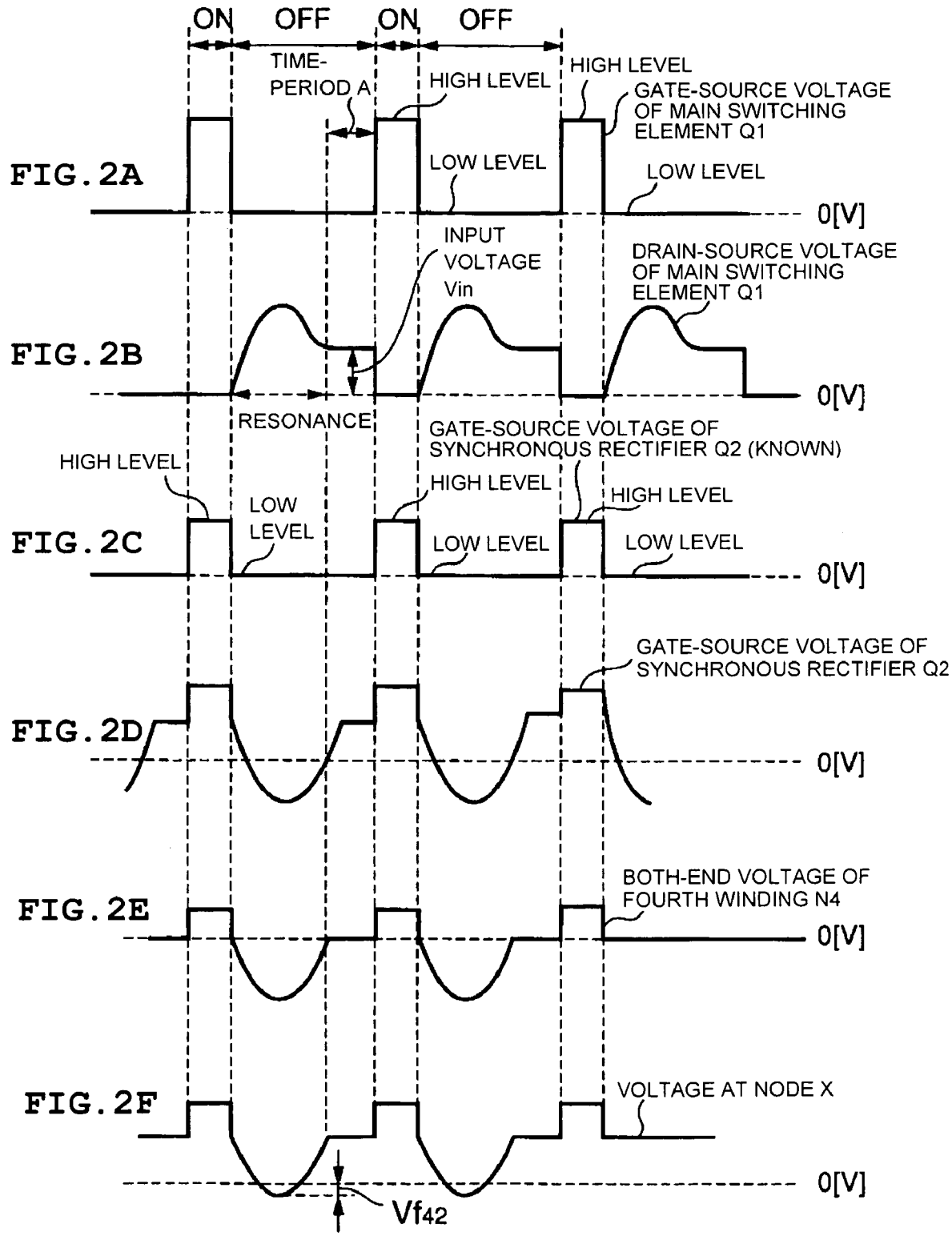

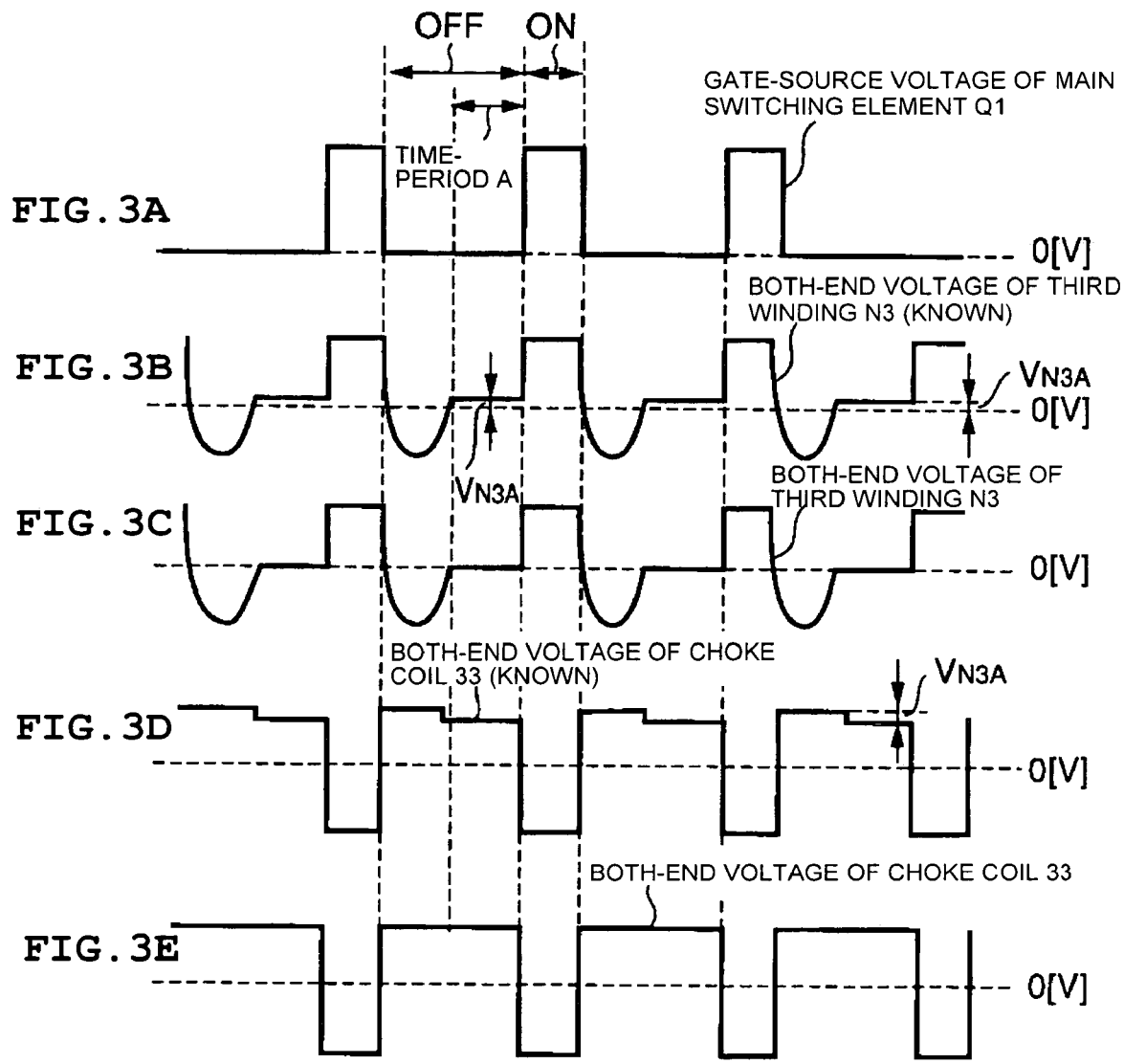

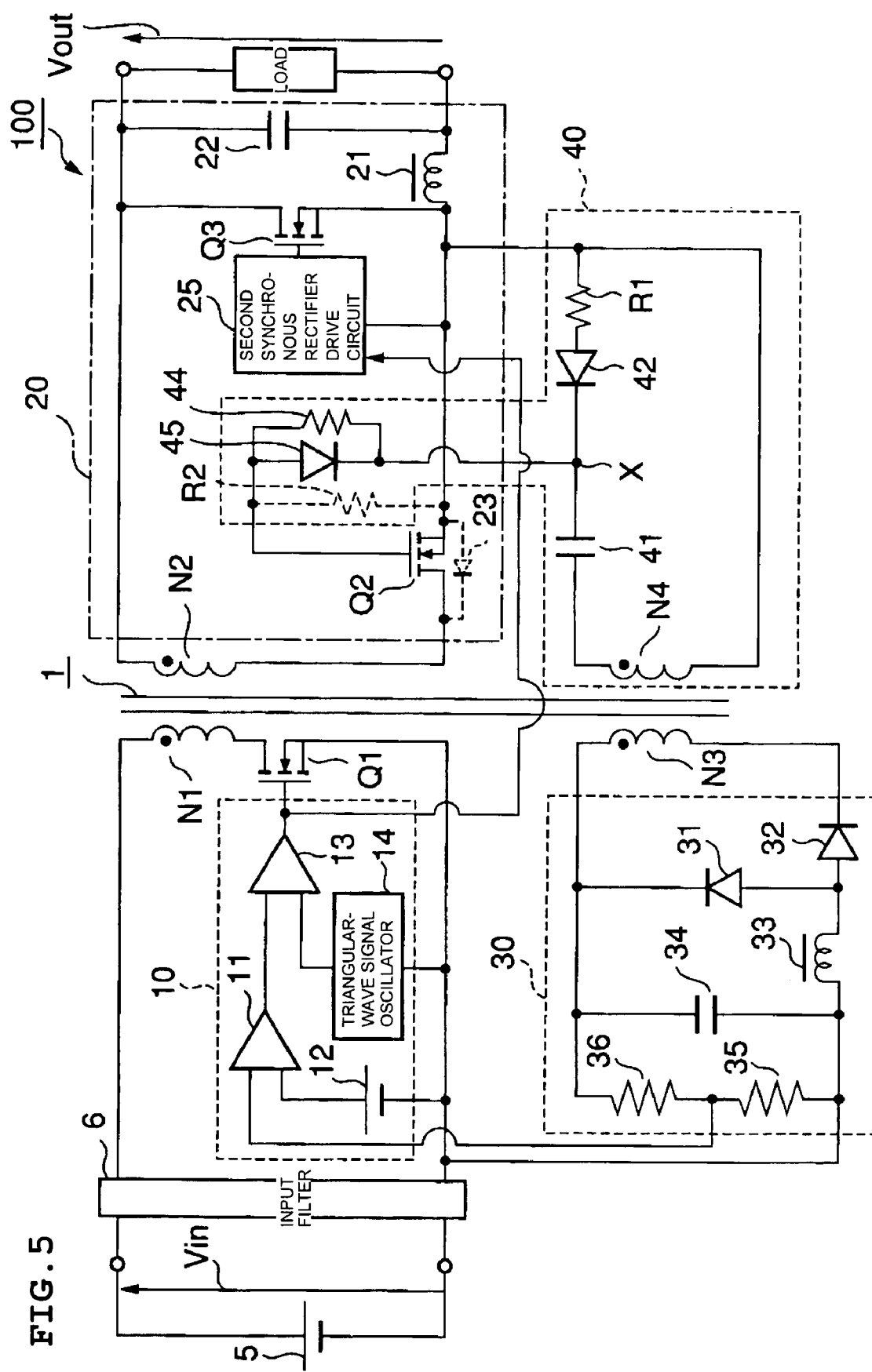

SWITCHING ELECTRIC SOURCE DEVICE

BACKGROUND OF THE INVENTION

1. Field of the Invention

The present invention relates to a switching electric source device including a transformer and a circuit for rectifying electric power output from a secondary winding of the transformer by use of a synchronous rectifier.

2. Description of the Related Art

A switching electric source device has been proposed which is provided with a detection circuit for indirectly detecting an output voltage, and controls a main switching element based on detection results by the detection circuit according to a PWM system (e.g., see Japanese Unexamined Patent Application Publication No. 2001-25245 (Patent Document 1)). FIG. 9 shows an example of a circuit configuration of major components of the switching electric source device having the detection circuit described above.

The switching electric source device 200 contains a transformer 1. A main switching element (MOSFET) Q1 is connected to the primary winding N1 of the transformer 1. The circuit containing the transformer 1 and the main switching element Q1 connected in series is connected to an external input electric source 5 via an input filter 6.

A secondary rectifying smoothing circuit 20 is connected to a secondary winding N2 of the transformer 1. The secondary rectifying smoothing circuit 20 includes a first synchronous rectifier Q2 (switching element (MOSFET)) connected in series with the secondary winding N2, a second synchronous rectifier Q3 (switching element (MOSFET)) connected in parallel to the secondary winding N2, and a circuit containing a choke coil 21 and a capacitor 22 connected in series, the circuit containing the choke coil 21 and the capacitor 22 being connected in parallel to the synchronous rectifier Q3. The secondary rectifying smoothing circuit 20 rectifies output power from the secondary winding N2, using the switching operation of the synchronous rectifiers Q2 and Q3, smoothes the output power via the choke coil 21 and the capacitor 22, and outputs DC voltage Vout to an external load.

A second synchronous rectifier drive circuit 25 is connected to the switching control terminal (gate terminal) of the synchronous rectifier Q3. The second synchronous rectifier drive circuit 25 controls the switching operation of the synchronous rectifier Q3 such that the synchronous rectifier Q3 carries out the switch on-off operation inverting that of the main switching element Q1. In particular, when the main switching element Q1 is off, the synchronous rectifier Q3 is on, and when the main switching element Q1 is on, the synchronous rectifier Q3 is off, caused by the second synchronous rectifier drive circuit 25.

Moreover, the synchronous rectifier Q2 carries out the same switch on-off operation as that of the main switching element Q1, using the induced voltage of the secondary winding N2.

A third winding N3 is provided for the transformer 1. A detection circuit 30 is connected to the third winding N3. The detection circuit 30 includes diodes 31 and 32 which are rectifying elements for rectifying voltage induced in the third winding N3, a choke coil 33 and a capacitor 34 for smoothing the voltage, and voltage-dividing resistors 35 and 36 for dividing the rectified, smoothed voltage. The voltage corresponding to voltage induced in the secondary winding N2 is induced in the third winding N3. Thus, the detection circuit 30 rectifies and smoothes the induced voltage in the third winding N3, and thereby, indirectly detects the output voltage Vout which is output from the secondary rectifying smoothing circuit 20 to a load, and outputs the detection voltage with respect to the output voltage Vout.

A control circuit 10 is connected to the gate terminal as a switching control terminal of the main switching element Q1. The control circuit 10 controls the switch on-off operation of the main switching element Q1 based on the detection voltage according to a PWM system. The control circuit 10 includes an error amplifier 11, a reference voltage source 12, a comparator 13, and a triangular-wave signal oscillator 14. In particular, in the control circuit 10, the error amplifier 11 amplifies an error voltage between the detection voltage with respect to the output voltage Vout obtained in the detection circuit 30 and the reference voltage output from the reference voltage source 12. The comparator 13 compares the amplified voltage to the magnitude of a triangular-wave signal output from the triangular-wave signal oscillator 14. Thus, a switching-control signal (a pulse signal) generated based on the comparison results is applied to the gate terminal of the main switching element Q1. When a switching control signal is on a high level, the main switching element Q1 turns on. When the switching control signal is on a low level, the main switching element Q1 turns off. As described above, the switching control for the main switching element Q1 is carried out by the control circuit 10 based on detection results obtained in the detection circuit 30 which indirectly detects the output voltage Vout output from the secondary rectifying smoothing circuit 20.

Hereinafter, an example of the operation of the main circuit components of the switching electric source device 200 will be described with reference to waveform examples shown in FIGS. 10A to 10F.

For example, when the main switching element Q1 is on, which is caused by the control-operation of the control circuit 10 (e.g., an ON time period shown in FIGS. 10A to 10F), an input voltage Vin, input from the input electric source 5, is smoothed by the input filter 6 and supplied to the primary winding N1. Thereby, voltage is induced in the secondary winding N2. The induced voltage in the secondary winding N2 causes the synchronous rectifier Q2 to turn on (see FIG. 10D), and moreover, the synchronous rectifier Q3 is caused to turn off by the second synchronous rectifier drive circuit 25 (see FIG. 10C). The switching operation of the synchronous rectifiers Q2 and Q3 causes current to flow on the secondary side along a current loop from the secondary winding N2 via the load, the choke coil 21, and the synchronous rectifier Q2 to the secondary winding N2, so that an output voltage Vout is output to the load. With this current-conduction, magnetizing energy is stored in the choke coil 21.

Moreover, while the main switching element Q1 is in the ON time period, the current based on the induced voltage of the third winding N3 flows through the detection circuit 30 along a current-loop from the third winding N3 via the voltage-dividing resistors 35 and 36, the control circuit 10, the choke coil 33 and the diode 32 to the third winding N3. Thus, the detection circuit with respect to the output voltage Vout is output from the detection circuit 30 to the control circuit 10. With this current-flow, the exciting energy corresponding to the output voltage Vout is stored in the choke coil 33.

When the main switching element Q1 is off (e.g., the OFF time period in FIGS. 10A to 10F), the synchronous rectifier Q2 is off, and the synchronous rectifier Q3 is on. Thereby, the exciting energy stored in the choke coil 21, as current, conducts along a current loop from the choke coil 21 via the synchronous rectifier Q3 and the load to the choke coil 21, so that the output voltage Vout is output to the load. Then, in the detection circuit 30, the detection current with respect to the output voltage Vout and based on the exciting energy of the choke coil 33 flows along a current loop passing through the choke coil 33, the diode 31, the voltage-dividing resistors 35 and 36, and the control circuit 10. Thus, the detection voltage with respect to the output voltage Vout is output from the detection circuit 30.

When the main switching element Q1 is switched off, resonance occurs due to the primary winding N1 and the parasitic capacitance of the main switching element Q1 based on the exciting energy of the primary winding N1, as shown by a time period B in FIGS. 10A to 10F. During the time period (a time period A) ranging from the completion of the resonance operation to the switching on of the main switching element Q1, the exciting current of the secondary winding N2 flows along a current loop of from the parasitic diode (body diode) 23 of the synchronous rectifier Q2 via the secondary winding N2 and the synchronous rectifier Q3 to the body diode 23, so that the excitation of the secondary winding N2 can be maintained due to the existence of the parasitic diode (body diode) 23 between the drain-source of the synchronous rectifier Q2. Thus, the exciting current of the secondary winding N2 has no relationship to the output voltage Vout, since the exciting current does not flow through the choke coil 21.

The current flows through the secondary winding N2 via the body diode 23 as described above. The voltage corresponding to the voltage drop in the body diode 23 is induced in the secondary winding N2. The secondary winding N2 and the third winding N3 are magnetically coupled to each other. Thus, voltage $V_{N3A}$ corresponding to the induced voltage in the secondary winding N2 is induced in the third winding N3 during the time period A (e.g., see FIG. 10E). Current based on the induced voltage $V_{N3A}$ of the third winding N3 flow along a current loop of from the choke coil 33 via the diode 32, the third winding N3 the voltage-dividing resistors 35 and 36, the control circuit 10 to the choke coil 33. Thus, the current is superposed on the detection current with respect to the output voltage Vout and based on the exciting energy for the choke coil 33.

The voltage $V_{N3A}$ induced in the third winding N3 during the time period A in the OFF time period of the main switching element Q1 (from the completion of the resonance operation on the primary side to the switching on of the main switching element Q1) can be expressed by the following numerical formula: $V_{N3A}=Vf\times(N3/N2)$ in which Vf represents the voltage drop in the body diode 23 of the synchronous rectifier Q2, N2 represents the number of turns of the secondary winding N2, and N3 represents the number of turns of the third winding N3. During the time period A in which the induced voltage $V_{N3A}$ is generated, the current based on the induced voltage $V_{N3A}$, and the detection current with respect to the output voltage Vout and based on the exciting energy of the choke coil 33 flows in the detection circuit 33. Thus, the voltage rectified in the detection circuit 30 is equal to the sum of the voltage between the both ends of the choke coil 33, the voltage drop in the diode 32, and the induced voltage $V_{N3A}$ in the third winding N3. However, ordinarily, the impedance of the control circuit 10 is considerably higher than that of the detection circuit 30. Therefore, the both-end voltage of the choke coil 33 during the time period A is lower than the both-end voltage of the choke coil 33 during the time period B in an amount equal to the induced voltage $V_{N3A}$ of the third winding N3 which is due to the voltage drop in the body diode 23 of the synchronous rectifier Q2 (e.g., see FIG. 10F).

The current flowing in the detection circuit 30 based on the induced voltage $V_{N3A}$ of the third winding N3 during the time period A in the OFF time period of the main switching element Q1 corresponds to the exciting energy of the secondary winding N2, and is independent of the output voltage Vout. Thus, a problem occurs in that the current is superposed on the detection current with respect to the output voltage Vout and based on the exciting energy of the choke coil 33, and thus, the correct detection voltage with respect to the output voltage Vout can not be obtained by the detection circuit 30. The voltage drop Vf in the body diode 23 during the OFF time period of the synchronous rectifier Q2 is significantly large compared to that during the ON time period. Thus, the current superposed on the detection current with respect to the output voltage Vout of the detection circuit 30 is not negligible. This deteriorates the detection accuracy of the output voltage Vout of the detection circuit 30.

The time period A in the OFF time period of the main switching element Q1 becomes longer as the input voltage Vin increases. The longer the time period A is, the lower the detection accuracy of the output voltage Vout obtained by the detection circuit 30 is. Therefore, the output voltage Vout to the load is reduced due to the switching control of the main switching element Q1 which is carried out by the control circuit 10 based on the detection voltage of the detection circuit 30. Moreover, the higher the ambient temperature is, the larger the voltage drop Vf in the body diode 23 of the synchronous rectifier Q2 is. Accordingly, the lower the ambient temperature is, the lower the detection accuracy of the detection circuit 30 with respect to the output voltage Vout is, and thus, the output voltage Vout to the load becomes lower. It is desirable to have an output voltage characteristic which is constant irrespective of the input voltage Vin and a change in the ambient temperature, as shown by solid line a in the graph of FIG. 11. According to the configuration of the switching electric source device 200 shown in FIG. 9, the following output voltage characteristic is obtained: the output voltage Vout becomes lower, as the input voltage Vin becomes higher, and moreover, the ratio of the variation of the output voltage Vout to that of the input voltage Vin increases as the ambient temperature becomes lower, which is shown by dotted lines b, c, and d in the graph of FIG. 11.

In some cases, an external diode is provided between the drain-source of the synchronous rectifier Q2. Also, the above-described problems occur.

SUMMARY OF THE INVENTION

In order to solve the above-described problems, preferred embodiments of the present invention provide a switching electric source device including a transformer, a main switching element connected to a primary winding of the transformer, a secondary rectifying smoothing circuit for rectifying and smoothing electric power output from a secondary winding of the transformer based on the switch on-off operation of the main switching element, and externally outputting the rectified, smoothed electric power, a detection circuit for indirectly detecting the output voltage from the secondary rectifying smoothing circuit utilizing voltage induced in a third winding of the transformer, and a control circuit for controlling the switch on-off operation of the main switching element for stabilization of the output voltage from the secondary rectifying smoothing circuit based on the detection voltage for the output voltage obtained by the detection circuit, wherein the secondary rectifying smoothing circuit includes a first synchronous rectifier connected in series with the secondary winding and performing the same switch on-off operation as that of the main switching element, and a second synchronous rectifier connected in parallel to the secondary winding and performing the switch on-off operation inverting that of the main switching element, the first and second rectifiers being operative to rectify the output power from the secondary winding, and a first synchronous rectifier control circuit is provided, which detects the resonance state generated based on the exciting energy of the primary winding after the main switching element switches off, and causes the first synchronous rectifier to switch on earlier during the time period from the completion of the resonance state to the switching on of the main switching element, based on the detection signal for the resonance state.

According to the above-described preferred embodiment of the present invention, the first synchronous rectifier control circuit is provided, which causes the first synchronous rectifier to switch on earlier during the time period (the time period A) ranging from the completion of the resonance state on the primary side to the switching on of the main switching element in the OFF time period of the main switching element. Thus, the first synchronous rectifier can be switched on during the time period A by the first synchronous rectifier control circuit. This switch-on operation of the first synchronous rectifier causes the exciting current of the secondary winding to flow between the drain-source of the first synchronous rectifier (MOSFET). Thus, current can be prevented from flowing through the body diode (parasitic diode) of the first synchronous rectifier. Accordingly, a problem in that the detection accuracy of the detection circuit with respect to the output voltage is deteriorated during the time period A can be solved. The above-described deterioration of the detection accuracy is caused by the induced voltage of the third winding which is developed due to the voltage drop in the body diode of the first synchronous rectifier during the time period A. Accordingly, a predetermined output voltage can be stably output from the secondary rectifying smoothing circuit, irrespective of the variation of the input voltage and that of the ambient or environmental temperature. Thus, the reliability of the switching electric source device can be considerably enhanced. Also, in the case where an external diode is provided for the first synchronous rectifier, the same advantages as described above can be obtained.

Preferably, the first synchronous rectifier control circuit includes a fourth winding provided for the transformer and a circuit including a DC cut capacitor and a rectifying element connected in series, the circuit including the DC cut capacitor and the rectifying element connected in series is connected in series with the fourth winding with the DC cut capacitor being arranged on the fourth winding side, and a node between the DC cut capacitor and the rectifying element is connected to a switching control terminal provided for the first synchronous rectifier. Also, preferably, a resistor is connected in series with the rectifying element, the circuit including the rectifying element and the resistor connected in series is connected in series with the DC cut capacitor, a node between the DC cut capacitor and the circuit including the rectifying element and the resistor connected in series is connected to the switching control terminal of the first synchronous rectifier. Thus, the first synchronous rectifier control circuit can be realized utilizing the simple circuit configuration.

Preferably, a circuit including a resistor and a rectifying element connected in parallel is connected to a power conduction line between the circuit including the DC cut capacitor and the rectifying element connected in series and the switching control terminal of the first synchronous rectifier. Thereby, the resistor of the circuit including the resistor and the rectifying element connected in parallel, and the internal capacitance (parasitic capacitance) of the first synchronous rectifier can constitute a time constant circuit. Thus, the timing at which the first synchronous rectifier switches on during the time period A can be easily controlled by adjustment of the time constant of the time constant circuit. Moreover, when the first synchronous rectifier is caused to switch off, the voltage of the switching control terminal of the first synchronous rectifier can be steeply increased, due to the forward characteristic of the rectifying element of the circuit including the resistor and the rectifying element.

Preferably, the first synchronous rectifier control circuit includes an off-control circuit which causes the electric charges stored between the gate-source of the first synchronous rectifier to be discharged and thus, causes the first synchronous rectifier to switch off, when the main switching element switches off. Accordingly, when the main switching element switches off, the electric charges stored between the gate-source of the first synchronous rectifier can be instantaneously discharged, and the gate-source voltage of the first synchronous rectifier can be reduced to the 0 level. Thereby, disturbance of the circuit operation of the switching electric source device can be eliminated. For example, the above-described disturbance occurs due to reversed current or the like which is due to the electric charges remaining between the gate-source of the first synchronous rectifier immediately after the main switching element switches off.

Preferably, the electric source for the first synchronous rectifier control circuit includes a winding which starts power-outputting a positive voltage when the main switching element provided for the transformer switches off. Also, preferably, the first synchronous rectifier control circuit uses, as an electric source, the choke coil for smoothing provided in the secondary rectifying smoothing circuit. Also, the first synchronous rectifier control circuit uses a winding magnetically coupled to the choke coil for smoothing provided for the secondary rectifying smoothing circuit. Thereby, electric power for driving the discharge control switch element to switch on when the main switching element switches off can be developed using the simple configuration.

Preferred embodiments of the present invention may be applied to a switching electric power device in which a main switching element connected to a primary winding of a transformer is controlled by a PWM system, electric power output from the secondary winding based on the switch on-off operation of the main switching element is rectified by use of a synchronous rectifier and smoothed, and the rectified and smoothed voltage is externally output.

Other features, elements, characteristics and advantages of the present invention will become more apparent from the following detailed description of preferred embodiments thereof with reference to the attached drawings.

BRIEF DESCRIPTION OF THE DRAWINGS

FIGS. 2A to 2F are waveform charts illustrating an example of the operation of the components characteristic of the first preferred embodiment of the present invention;

FIGS. 3A to 3E are waveform charts which illustrate advantages obtained by the configuration of the first preferred embodiment of the present invention;

FIG. 5 is a circuit diagram showing the main components of a switching electric source device according to a second preferred embodiment of the present invention;

DETAILED DESCRIPTION OF PREFERRED EMBODIMENTS

Hereinafter, preferred embodiments according to the present invention will be described with reference to the drawings.

Figure 1:
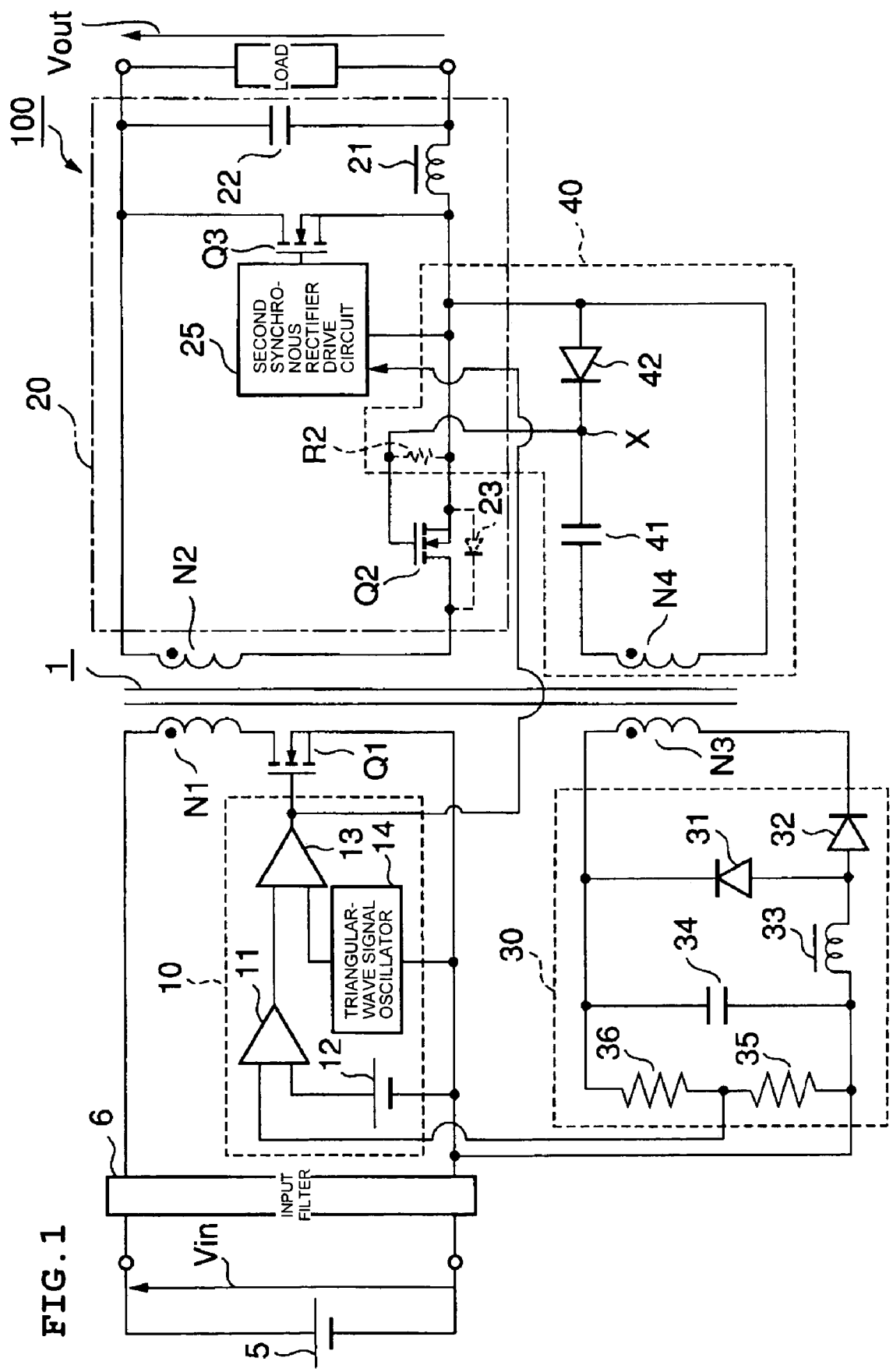
FIG. 1 is a circuit diagram showing the main components of a switching electric source device according to a first preferred embodiment of the present invention.
Figure 9:
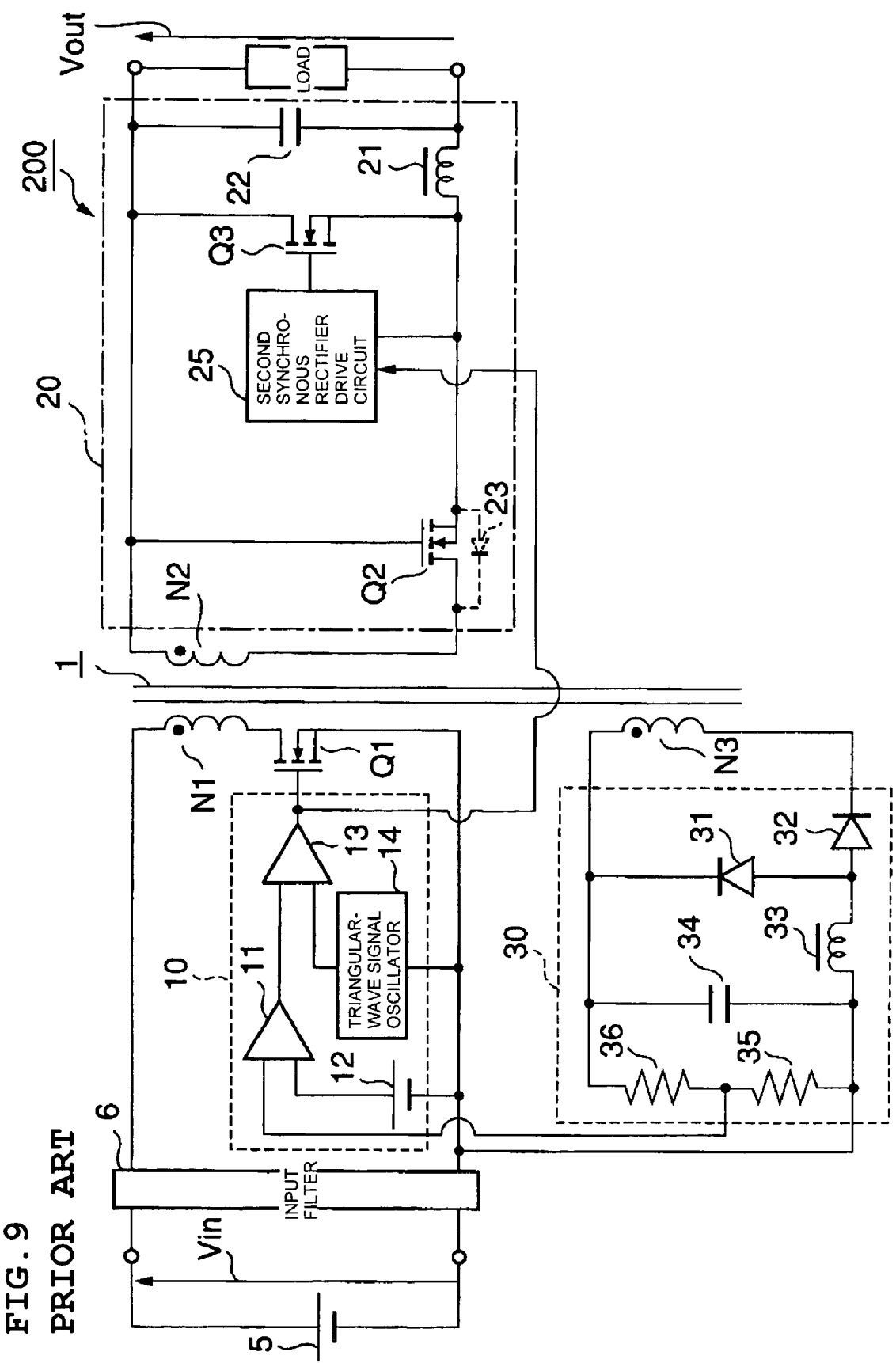
FIG. 9 is a circuit diagram of a known example of the switching electric source device.
Figure 10:
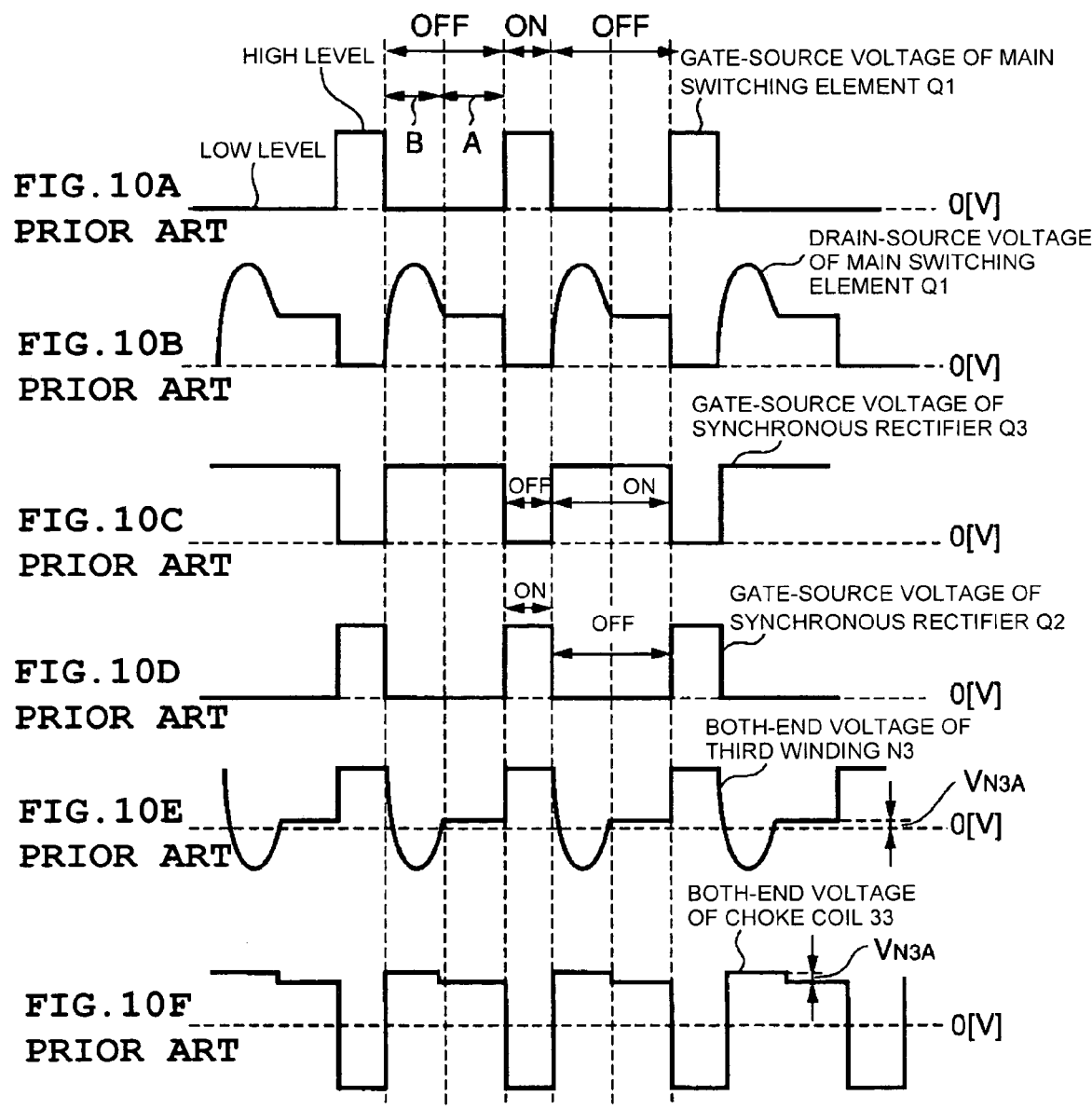
FIGS. 10A to 10F are waveform charts which illustrate an example of the operation of the main components shown in FIG. 9.
Figure 11:
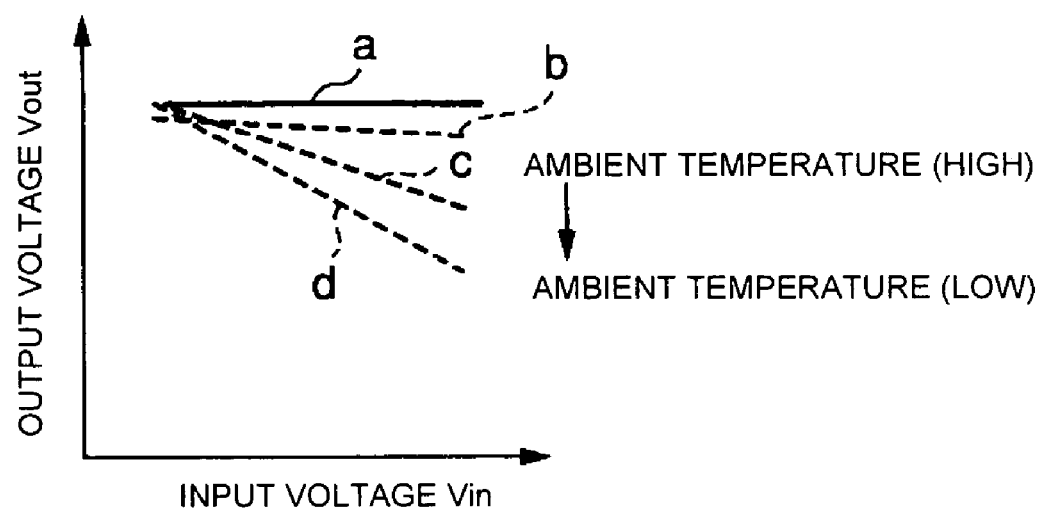
FIG. 11 illustrates problems of the switching electric source device shown in FIG. 9.

FIG. 1 shows the main circuit components of a switching electric source device according to a first preferred embodiment of the present invention. In the description of the first preferred embodiment, the same components as those of the switching electric source device 200 shown in FIG. 9 are designated by the same reference numerals, and the description thereof is not repeated.

The switching electric source device 100 according to the first preferred embodiment includes of a forward-type DC—DC converter. In the switching electric source device 100, a transformer 1 is provided with a fourth winding N4 in addition to a primary winding N1, a secondary winding N2, and a third winding N3.

A circuit including a DC-cut capacitor 41 and a diode 42 as a rectifying element connected in series is connected in series with the fourth winding N4 with the diode 42 being arranged on the fourth winding N4 side. In the circuit including the DC-cut capacitor 41 and the diode 42 connected in series, the cathode of the diode 42 is connected to the DC-cut capacitor 41, and the anode of the diode 42 is connected to the ground. A node X between the cathode of the diode 42 and the DC-cut capacitor 41 is connected to the switching control terminal (gate terminal) of the synchronous rectifier Q2 (MOSFET) which is a first synchronous rectifier. According to the first preferred embodiment, the fourth winding N4, the DC-cut capacitor 41, and the diode 42 constitute a first synchronous rectifier control circuit 40. It is to be noted that the configuration of the first preferred embodiment is the same as that of the switching electric source device 200 shown in FIG. 9 except that the first synchronous rectifier control circuit 40 is provided.

An example of the circuit operation of the first synchronous rectifier control circuit 40 will be described with reference to waveform examples shown in FIGS. 2A to 2F. In the fourth winding N4, a voltage is induced which has an inverted waveform with respect to that of the drain-source voltage of the main switching element Q1 shown in FIG. 2B (see FIG. 2E). In particular, in the fourth winding N4, the voltage waveform appears due to the resonance operation of the primary winding N1 and the main switching element Q1 during the OFF time period of the main switching element Q1. The induced voltage of the fourth winding N4 functions as a detection signal with respect to the resonance state of the primary winding N1 and the main switching element Q1 during the OFF time period of the main switching element Q1.

The DC component of the induced voltage of the fourth winding N4 is cut by the DC-cut capacitor 41. Regarding the AC component passing through the DC-cut capacitor 41, the 0 (V) level is enhanced, so that the voltage shown in FIG. 2F is generated. The voltage is applied to the gate terminal of the synchronous rectifier Q2 via the node X between the DC-cut capacitor 41 and the diode 42.

Regarding the voltage at the node X shown in FIG. 2F, the lowest voltage is lower than 0 (V) by an amount equal to the forward voltage $Vf_{42}$ of the diode 42. The forward voltage $Vf_{42}$ of the diode 42 is very small. Thus, the lowest voltage at the node X may be taken as about 0(V).

The voltage applied to the gate terminal of the synchronous rectifier Q2 via the first synchronous rectifier control circuit 40 (node X) causes the gate-source voltage of the synchronous rectifier Q2 to change as shown in FIG. 2D. Therefore, the gate-source voltage of the synchronous rectifier Q2 exceeds the threshold voltage of the synchronous rectifier Q2 during the time period (the time period A) from the completion of the resonance state of the primary winding N1 and the main switching element Q1 to the switch on of the main switching element Q1 in the OFF time period of the main switching element Q1. Thereby, the synchronous rectifier Q2 starts the ON operation earlier than the switch-on of the main switching element Q1.

In particular, according to the configuration of the switching electric source device 200 shown in FIG. 9, the gate-source voltage of the synchronous rectifier Q2 is on the low level, as shown in FIG. 2C, and the synchronous rectifier Q2 is off during the entire OFF time period of the main switching element Q1. On the other hand, according to the first preferred embodiment, the gate-source voltage of the synchronous rectifier Q2 changes corresponding to the voltage applied by the first synchronous rectifier control circuit 40. Thus, the gate-source voltage of the synchronous rectifier Q2 exceeds the threshold voltage, and causes the synchronous rectifier Q2 to switch on earlier during the time period A in the OFF time period of the main switching element Q1 as shown in FIG. 2D.

According to the configuration of the switching electric source device 200 shown in FIG. 9, the current flows in a current route passing through the body diode 23 of the synchronous rectifier Q2 and the secondary winding N2 during the time period A. Thus, the voltage corresponding to the voltage drop in the body diode 23 is generated in the secondary winding during the time period A. Therefore, the voltage $V_{N3A}$ is induced in the third winding N3 during the time period A, as shown in an example of the waveform of FIG. 3B. This causes the both-end voltage of the choke coil 33 to decrease by an amount of the voltage $V_{N3A}$, as shown in the voltage waveform example of FIG. 3D. Accordingly, the correlation between the output voltage Vout from the secondary rectifying smoothing circuit 20 and the detection voltage of the detection circuit 30 is deteriorated. Thus, a problem occurs in that the high precision switching control by the main switching element Q1 can not be carried out for stabilization of the output voltage Vout.

On the other hand, according to the configuration of the first preferred embodiment, the synchronous rectifier Q2 is switched on earlier during the time period A in the OFF time period of the main switching element Q1. Thus, due to the switch-on operation of the synchronous rectifier Q2, the exciting current of the secondary winding N2 flows through between the drain-source of the synchronous rectifier Q2, not through the body diode 23 of the synchronous rectifier Q2. Thus, the voltage, caused by the voltage drop in the body diode 23, is prevented from being generated in the secondary winding N2. Thus, as shown in the waveform examples of FIGS. 3C and 3E, the voltage of the third winding N3 becomes 0(V) during the time period A, and the both-end voltage of the choke coil 33 can be suppressed from varying during the OFF time period of the main switching element Q1. Thus, the body diode 23 of the synchronous rectifier Q2 is prevented from exerting negative influences on the third winding side. Thereby, the switching control of the main switching element Q1 for stabilization of the output voltage Vout can be carried out with high precision.

Thus, according to the first preferred embodiment, the output voltage Vout having a predetermined value can be output with high stability, and is not negatively influenced by changes in the length of the time period A caused by the variation of the input voltage Vin and that of the voltage drop in the body diode 23. Thereby, a reliable switching electric source device can be provided.

Figure 4A:
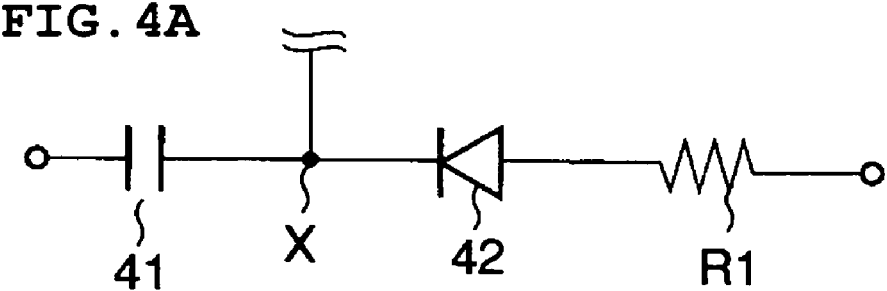
FIGS. 4A and 4B show a modification of the first preferred embodiment of the present invention.
Figure 4B:
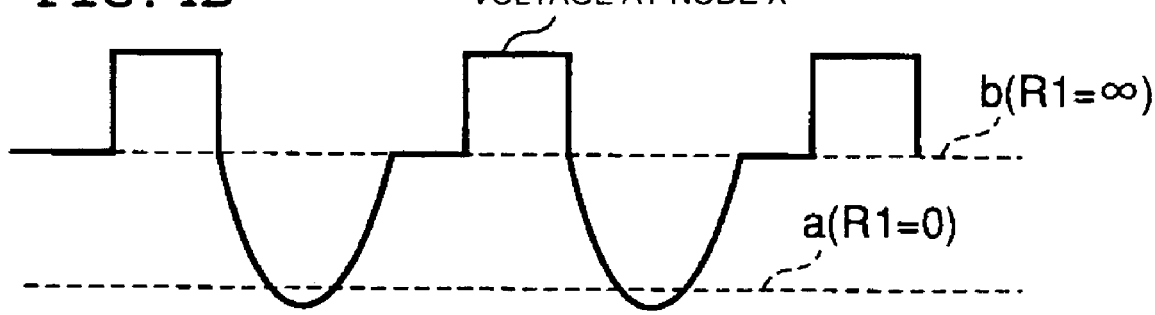

In addition to the configuration of the first preferred embodiment, a resistor R1 may be connected in series with the anode of the diode 42 of the first synchronous rectifier control circuit 40, or the resistor R1 may be incorporated in series between the cathode of the diode 42 and the node X. The 0 (V) level at the node X can be adjusted by the arrangement of the resistor R1. In particular, in the case where the resistor R1 is not provided (the resistance of the resistor R1 is zero (R1=0)), the 0 (V) level of the voltage at the node X is one shown by dotted line a in FIG. 4B. On the other hand, in the case where the resistor R1 is provided, the 0 (V) level of the voltage at the node X can be more shifted to the upper side in FIG. 4B as the resistance of the resistor R1 is increased.

The timing at which the gate-source voltage of the synchronous rectifier Q2 reaches the threshold voltage during the OFF time period of the main switching element Q1 can be controlled by adjustment of the 0 (V) level at the node X using the resistor R1. In other words, the resistance of the resistor R1 is appropriately set corresponding to the threshold voltage of the synchronous rectifier Q2, and thereby, the synchronous rectifier Q2 can be switched on at the predetermined timing during the time period A (e.g., the starting point of the time period A (the timing at which the resonance state is completed)).

Hereinafter, a second preferred embodiment will be described. In the description of the second preferred embodiment, the same components as those of the first preferred embodiment are designated by the same reference numerals. The description of the components is not repeated.

According to the second preferred embodiment, as shown in FIG. 5, a circuit including a resistor 44 and a diode 45 as a rectifying element connected in parallel is incorporated between the node X of the DC-cut capacitor 41 with the diode 42 (i.e., the node X between the DC-cut capacitor 41 and the circuit including the diode 42 and the resistor R1 connected in series) and the gate terminal, as a switching control terminal, of the synchronous rectifier Q2. The other circuit configuration is preferably the same as that of the first preferred embodiment.

According to the second preferred embodiment, the resistor 44 is provided, and thereby, the resistor 44 and the parasitic capacitance of the synchronous rectifier Q2 constitutes a time constant circuit. The time constant of the time constant circuit can be adjusted by variably setting the resistance of the resistor 44. Thus, the charging-speed of the gate-source voltage of the synchronous rectifier Q2 can be controlled by adjustment of the time constant of the time constant circuit. Thereby, the timing at which the synchronous rectifier Q2 is switched on earlier during the time period A in the OFF time period of the main switching element Q1 can be controlled.

Figure 6:
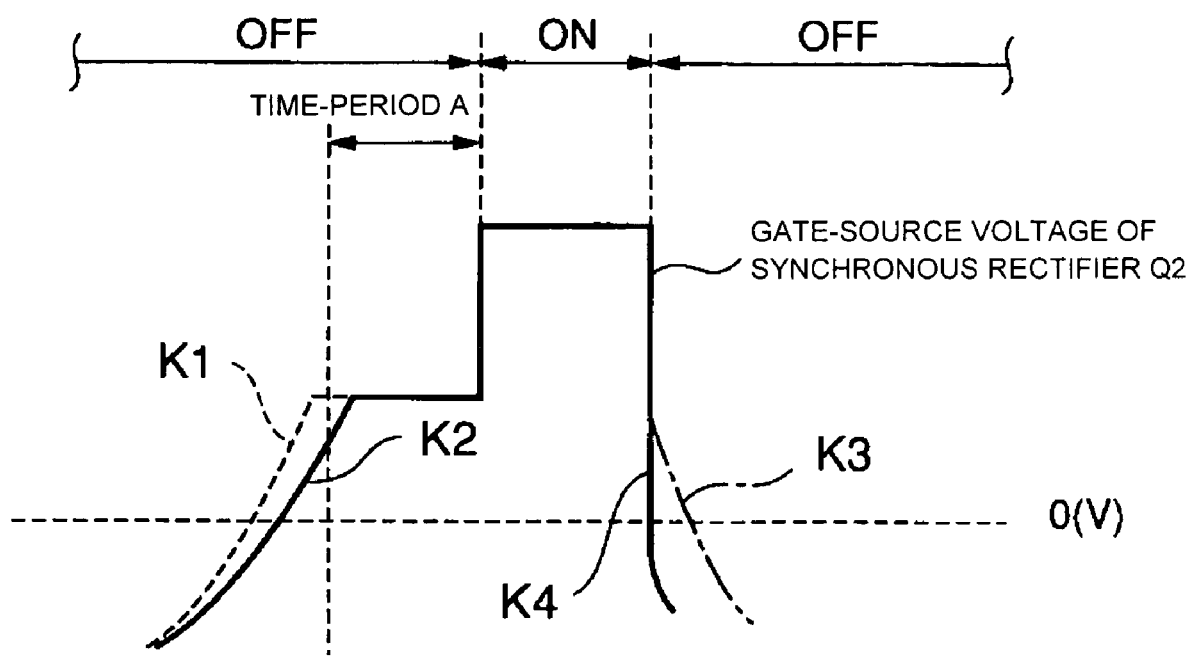
FIG. 6 shows advantages obtained by the configuration of the second preferred embodiment of the present invention.

For example, in the case where the gate-source voltage of the synchronous rectifier Q2 is charged as shown by dotted line K1 in FIG. 6 during the OFF time period of the main switching element Q1, the gate-source voltage of the synchronous rectifier Q2 exceeds the threshold voltage, and the synchronous rectifier Q2 switches on prior to the time period A. It is not preferred that the synchronous rectifier Q2 switches on prior to the time period A from the standpoint of the circuit operation of the switching electric source device 100. On the other hand, the configuration of the second preferred embodiment is provided, and thus, the charging speed for the gate-source voltage of the synchronous rectifier Q2 can be reduced as shown by solid line K2 in FIG. 6. Accordingly, the synchronous rectifier Q2 can be easily switched on during the time period A.

According to the example of FIG. 5, the resistor R1 is connected in series with the diode 42. Thus, the switch-on timing of the synchronous rectifier Q2 during the time period A can be controlled by utilization of the resistance of the resistor R1 as described above. According to the second preferred embodiment, the switch-on timing of the synchronous rectifier Q2 during the time period A can be controlled by adjustment of the respective resistances of the resistor R1 and the resistor 44. Therefore, the synchronous rectifier Q2 can be easily switched on at predetermined timing during the time period A.

According to the second preferred embodiment, the anode of the diode 45 is connected to the gate terminal of the synchronous rectifier Q2. Therefore, when the main switching element Q1 switches off, the electric charges between the gate-source of the diode 45 are rapidly discharged, due to the forward characteristic of the diode 45, as shown by solid line K4 in FIG. 6, compared to the case where the diode 45 is not provided (see chain line K3 in FIG. 6). Thus, the gate-source voltage of the synchronous rectifier Q2 can be steeply reduced.

According to the example shown in FIG. 5, the resistor R1 is connected in series with the anode of the diode 42. The resistor R1 may be connected between the cathode of the diode 42 and the node X. In the example of FIG. 5, the resistor R1 is connected in series with the diode 42. For example, in the case where the synchronous rectifier Q2 can be switched on at predetermined time during the time period A even if the resistor R1 is not provided, the resistor R1 may be omitted.

Hereinafter, a third preferred embodiment will be described. In the description of the third preferred embodiment, the same components as those of the first or the second preferred embodiment are designated by the same reference numerals, and the description thereof is omitted.

According to the above-described second preferred embodiment, the diode 45 is provided. Thus, when the main switching element Q1 is switched off, the gate-source voltage of the synchronous rectifier Q2 can be steeply reduced, due to the forward characteristic of the diode 45. However, in some cases, when the main switching element Q1 switches off, the electric charges between the gate-source of the synchronous rectifier Q2 are discharged too late. Thereby, for example, the gate-source voltage of the synchronous rectifier Q2 may be reduced slowly as shown by chain line K3 in FIG. 6. In this case, a problem occurs in that the circuit operation of the switching electric source device 100 becomes unstable.

The third preferred embodiment includes a configuration by which the gate-source voltage of the synchronous rectifier Q2 can be reduced securely and rapidly when the main switching element Q1 switches off. In particular, according to the third preferred embodiment, the first synchronous rectifier control circuit 40 includes a discharge line 47 for connecting the gate terminal of the synchronous rectifier Q2 to the ground, a discharge control switch element Q4 (e.g., MOSFET) for controlling the conduction on-off of the discharge line 47, a fifth winding N5 provided for the transformer 1 as an electric source, a capacitor 48 incorporated in series in a conduction line connecting the fifth winding N5 and the gate terminal of the discharge control switch element Q4 to each other, a diode 49 (rectifying element) whose cathode is connected to the conduction line between the capacitor 48 and the gate terminal of the discharge control switch element Q4 and whose anode is connected to the ground, and a resistor 50 provided between the gate terminal of the discharge control switch element Q4 and the ground.

Figure 8:
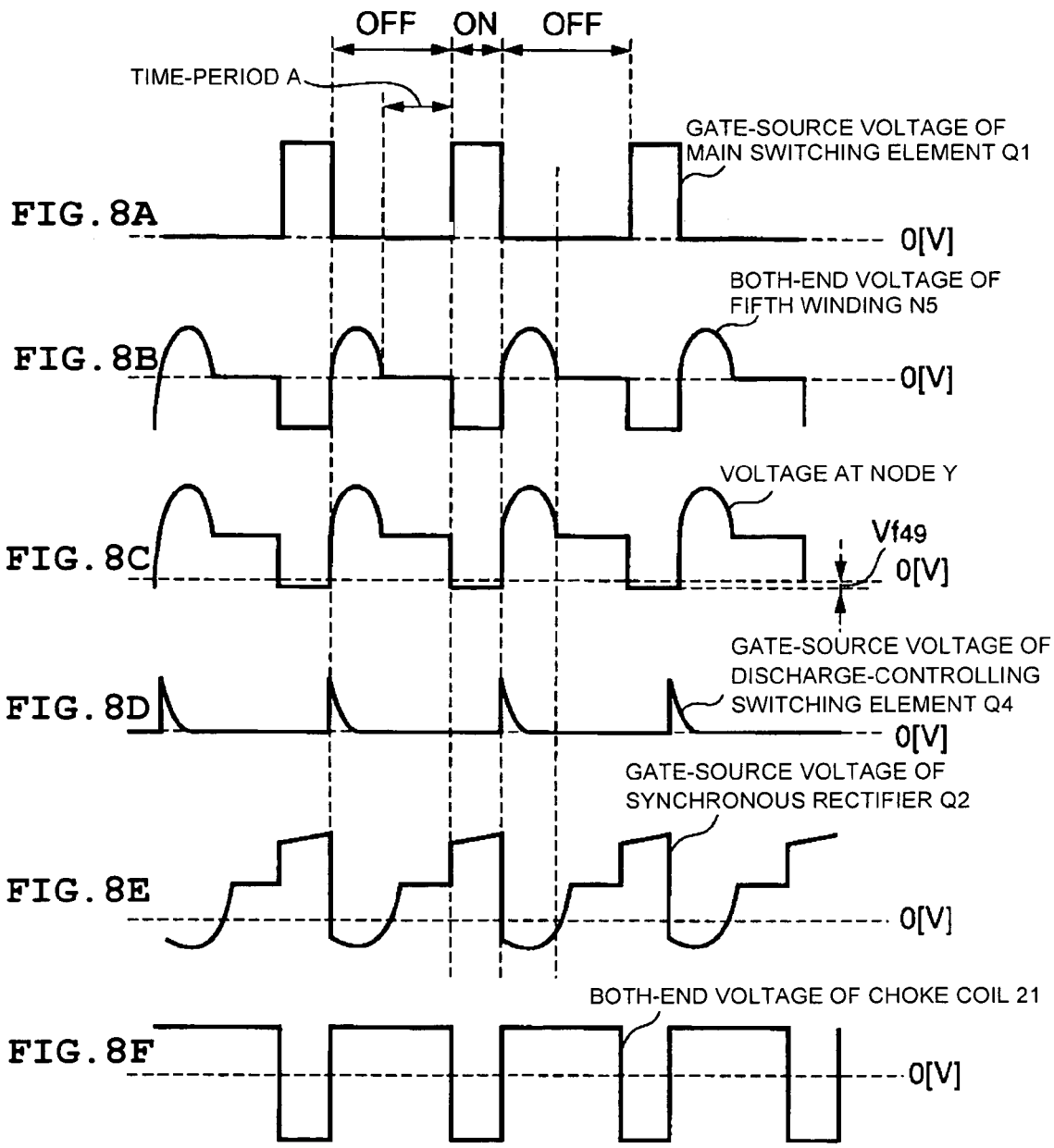
FIGS. 8A to 8F are waveform charts which illustrate an example of the operation of the components characteristic of the third preferred embodiment of the present invention.

The circuit operation of the components characteristic in the third preferred embodiment will be described with reference to the waveform examples shown in FIGS. 8A to 8F. For example, voltage having a waveform shown in FIG. 8B is induced in the fifth winding N5 of the transformer 1. That is, the voltage having a waveform inverting that of the primary winding N1 is induced in the fifth winding N5. The induced voltage of the fifth winding N5 becomes a positive voltage when the main switching element Q1 switches off.

Regarding the induced voltage of the fifth winding N5, the DC component is cut by the capacitor 48. The voltage passing through the capacitor 48, whose 0 (V) level is set by the diode 49 and which has a waveform shown in FIG. 8C, is output to the gate terminal of the discharge control switch element Q4 via the node Y between the capacitor 48 and the diode 49. It should be noted that the lowest voltage at the node Y is lower than 0 (V) by the voltage drop $Vf_{49}$ in the diode 49.

A voltage (trigger pulse signal) with a differentiated waveform shown in FIG. 8D is produced by a differentiating circuit including the resistor 50 and the parasitic capacitance of the discharge control switch element Q4, based on the voltage at the node Y, and is applied to the gate terminal of the discharge control switch element Q4. That is, when the main switching element Q1 switches off, the trigger pulse signal is applied to the gate terminal of the discharge control switch element Q4, so that the discharge control switch element Q4 switches on. Thereby, the discharge line 47 is conduction-on, and the electric charges stored between the gate-source of the synchronous rectifier Q2 is discharged via the discharge line 47. Thus, the synchronous rectifier Q2 switches off. In particular, according to the third preferred embodiment, the capacitor 48, the diode 49, and the resistor 50 constitutes an off-control circuit, which causes the discharge control switch element Q4 to switch on when the main switching element Q1 switches off, so that the electric charges stored between the gate-source of the synchronous rectifier Q2 is discharged via the discharge line 47, and thus, the synchronous rectifier Q2 switches off.

As described above, when the main switching element Q1 switches off, the electric charges stored between the gate-source of the synchronous rectifier Q2 can be discharged by force. Thus, the gate-source voltage of the synchronous rectifier Q2 can be steeply reduced. Accordingly, the problem caused by the slow reduction of the gate-source voltage of the synchronous rectifier Q2 can be solved.

According to the third preferred embodiment, the fifth winding N5 is provided as an electric source which generates electric power for driving the discharge control switch element Q4 to switch on when the main switching element Q1 switches off. However, the choke coil 21 on the secondary side can be used as an electric source instead of the fifth winding N5. That is, the both-end voltage of the choke coil 21 is synchronized with the on-off operation of the main switching element Q1 as shown in FIG. 8F. Thus, the both-end voltage of the choke coil 21 increases from its negative polarity to its positive polarity. Power for driving the discharge control switch element Q4 to switch on can be produced by utilization of the voltage of the choke coil 21.

A winding magnetically coupled to the choke coil 21 may be provided as an electric source instead of the fifth winding N5 and the choke coil 21. Power for driving the discharge control switch element Q4 to switch on is produced by utilization of voltage induced in the winding.

Figure 7:
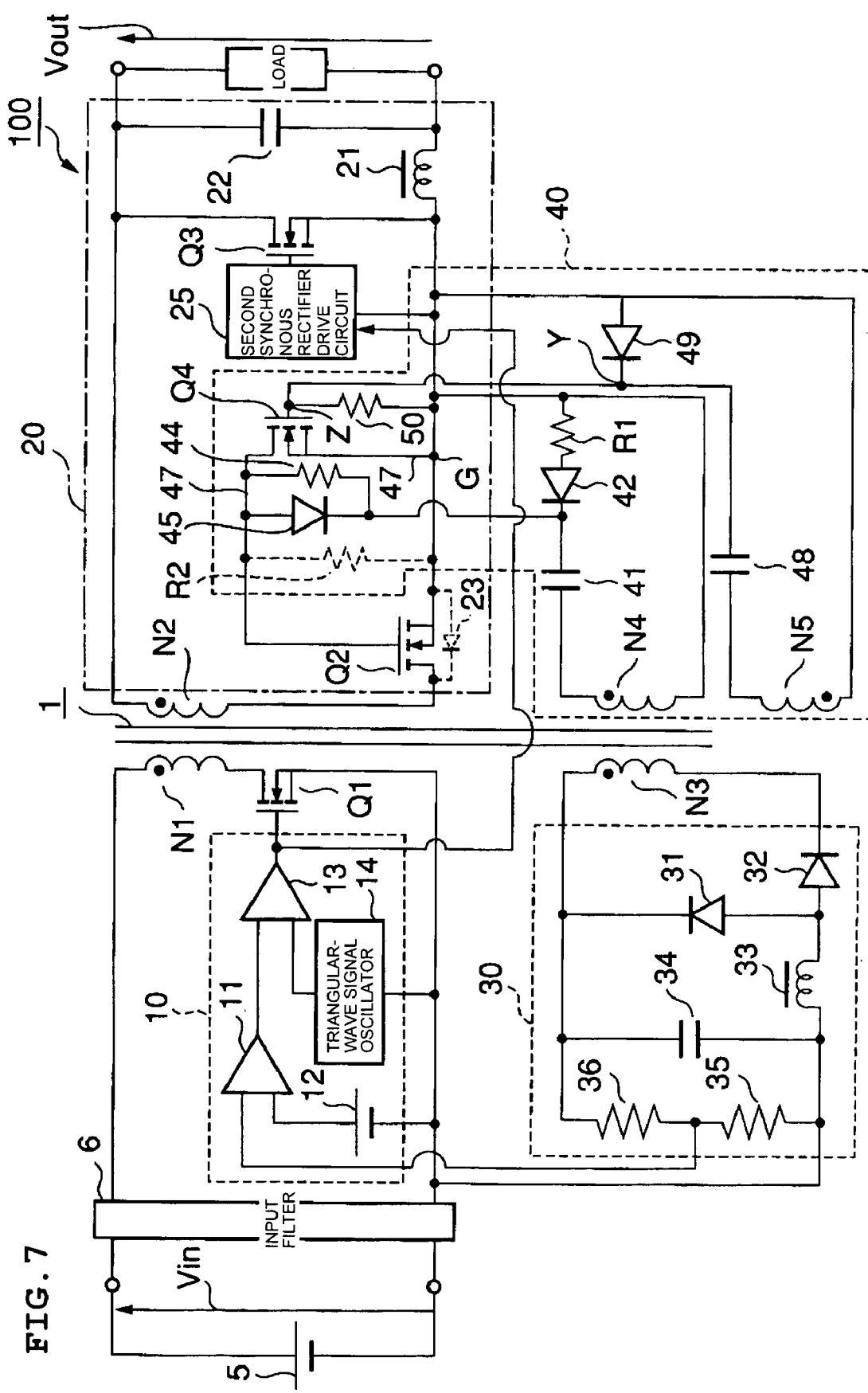
FIG. 7 is a circuit diagram showing the main components of a switching electric source device according to a third preferred embodiment of the present invention.

Moreover, in addition to the configuration of the third preferred embodiment, a resistor may be incorporated in the conduction line between the capacitor 48 of the first synchronous rectifier control circuit 40 and the gate terminal of the discharge control switch element Q4 (e.g., in FIG. 7, the conduction line between the capacitor 48 and the node Y, the conduction line between the node Y and the node Z, or the conduction line between the node z and the gate terminal of the discharge control switch element Q4). The following advantages are obtained by arrangement of the resistor; noises which are induced in the fifth winding N5, due to the leakage inductance of the transformer 1, can be reduced by the resistor. Thus, the error switching operation of the discharge control switch element Q4 caused by the noises can be prevented.

Moreover, a Zener diode may be provided instead of the diode 49. When the voltage induced in the fifth winding N5 is excessively large, a portion of the voltage can escape via the Zener diode. Accordingly, a voltage higher than the withstand voltage is prevented from being applied to the gate terminal of the discharge control switch element Q4. Thus, breaking of the gate terminal of the discharge control switch element Q4 can be avoided. Needless to say, in the case where it is estimated that the withstand voltage of the discharge control switch element Q4 is high, and thus, substantially no voltage higher than the withstand voltage is applied to the gate terminal of the discharge control switch element Q4, it is not necessary to provide a Zener diode. Also, in this case, the gate terminal of the discharge control switch element Q4 can be prevented from being broken.

The present invention is not restricted to the first to third preferred embodiments described above. Various forms may be adopted. For example, in addition to the respective examples of the first to third preferred embodiments, the gate terminal of the synchronous rectifier Q2 may be connected to the ground via a resistor R2 shown by dotted lines in FIGS. 1, 5, and 7. Thereby, the potential of the gate terminal of the synchronous rectifier Q2 can be stabilized.

Moreover, an external diode may be provided in parallel between the drain-source of the synchronous rectifier Q2 in addition to the respective configurations of the first to third preferred embodiments. This diode may cause the same problems as the body diode 23 of the synchronous rectifier Q2. However, even if the diode is provided, the output voltage Vout can be stabilized, not hazardously influenced with the variation of the input voltage Vin and the ambient or environmental temperature by providing the same peculiar configuration as that of each of the first to third preferred embodiments, similarly to the first to third preferred embodiments.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A switching electric source device comprising:
    a transformer including a primary winding, a secondary winding and a third winding;
    a main switching element connected to the primary winding of the transformer;
    a secondary rectifying smoothing circuit for rectifying and smoothing electric power output from the secondary winding of the transformer based on a switch on-off operation of the main switching element, and externally outputting the rectified, smoothed electric power;
    a detection circuit for indirectly detecting the output voltage from the secondary rectifying smoothing circuit utilizing voltage induced in the third winding of the transformer; and
    a control circuit for controlling the switch on-off operation of the main switching element for stabilization of the output voltage from the secondary rectifying smoothing circuit based on the detection voltage for the output voltage obtained by the detection circuit;
    wherein the secondary rectifying smoothing circuit includes a first synchronous rectifier connected in series with the secondary winding and arranged to perform the same switch on-off operation as that of the main switching element, and a second synchronous rectifier connected in parallel to the secondary winding and arranged to perform a switch on-off operation inverting that of the main switching element, the first and second synchronous rectifiers being operative to rectify the output power from the secondary winding, and a first synchronous rectifier control circuit is provided, which detects the resonance state generated based on the exciting energy of the primary winding after the main switching element switches off, and causes the first synchronous rectifier to switch on earlier during the time period from the completion of the resonance state to the switching on of the main switching element, based on the detection signal for the resonance state.

2. A switching electric source device according to claim 1, wherein the first synchronous rectifier control circuit includes a fourth winding provided for the transformer and an additional circuit including a DC cut capacitor and a rectifying element connected in series, the additional circuit including the DC cut capacitor and the rectifying element connected in series is connected in series with the fourth winding with the DC cut capacitor being arranged on the fourth winding side, and a node between the DC cut capacitor and the rectifying element is connected to a switching control terminal provided for the first synchronous rectifier.

3. A switching electric source device according to claim 2, wherein a resistor is connected in series with the rectifying element, the circuit including the rectifying element and the resistor connected in series is connected in series with the DC cut capacitor, a node between the DC cut capacitor and the circuit including the rectifying element and the resistor connected in series is connected to the switching control terminal of the first synchronous rectifier.

4. A switching electric source device according to claim 2, wherein a circuit including a resistor and a rectifier connected in parallel is connected to a power conduction line between the circuit including the DC cut capacitor and the rectifier connected in series and the switching control terminal of the first synchronous rectifier.

5. A switching electric source device according to claim 1, wherein the first synchronous rectifier includes a MOSFET, and the first synchronous rectifier control circuit includes a discharge line connecting the gate terminal as a switching control terminal of the first synchronous rectifier to the ground, a discharge control switch element for controlling the conduction on-off of the discharge line, an electric source for generating power for driving the discharge control switch element to switch on when the main switching element switches off, and an off-control circuit which causes the discharge control switch element to switch on based on the power for driving the discharge control switch element to switch on, so that the electric charges stored between the gate-source of the first synchronous rectifier is discharged via the discharge line, and thus, causes the first synchronous rectifier to switch off.

6. A switching electric source device according to claim 5, wherein the electric source for the first synchronous rectifier control circuit includes a winding which starts power-outputting a positive voltage when the main switching element provided for the transformer switches off.

7. A switching electric source device according to claim 5, wherein the secondary rectifying smoothing circuit includes a choke coil for smoothing, and the first synchronous rectifier control circuit uses voltage developed in the choke coil for driving the discharge control switch element to switch on so that the first synchronous rectifier is caused to switch off, when the main switching element switches off.

8. A switching electric source device according to claim 5, wherein the secondary rectifying smoothing circuit includes a choke coil for smoothing, and the electric source for the first synchronous rectifier control circuit includes a winding magnetically coupled to the choke coil for smoothing.

9. A switching electric source device according to claim 2, wherein the rectifying element is a diode.

10. A switching electric source device according to claim 1, wherein the first synchronous rectifier control circuit includes a fourth winding of the transformer and an additional circuit including a DC cut capacitor and a diode connected in series.

11. A switching electric source device according to claim 10, wherein a resistor is connected in series with an anode of the diode.

12. A switching electric source device according to claim 10, wherein a resistor is connected in series with a cathode of the diode.

13. A switching electric source device according to claim 1, wherein the transistor includes a fourth winding and a fifth winding arranged such that a voltage having a waveform inverted relative to that of the primary winding is induced in the fifth winding.

14. A switching electric source device according to claim 13, wherein the fifth winding is arranged to define an electric source which generates electric power for driving the discharge control switch element to switch on when the main switching element switches off.

15. A switching electric source device comprising:
a transformer including a primary winding, a secondary winding, a third winding and a fourth winding;
a main switching element connected to the primary winding of the transformer;
a secondary rectifying smoothing circuit for rectifying and smoothing electric power output from the secondary winding of the transformer based on a switch on-off operation of the main switching element, and externally outputting the rectified, smoothed electric power;
a detection circuit for indirectly detecting the output voltage from the secondary rectifying smoothing circuit utilizing voltage induced in the third winding of the transformer;
a control circuit for controlling the switch on-off operation of the main switching element for stabilization of the output voltage from the secondary rectifying smoothing circuit based on the detection voltage for the output voltage obtained by the detection circuit; and
a synchronous rectifier control circuit connected in series with the secondary winding and including the fourth winding, a DC-cut capacitor, and a diode.

16. A switching electric source device according to claim 15, wherein the DC-cut capacitor and the diode are connected in series with the fourth winding and the diode is arranged on the fourth winding side.

17. A switching electric source device according to claim 16, wherein a cathode of the diode is connected to the DC-cut capacitor and an anode of the diode is connected to ground.

18. A switching electric source device according to claim 17, wherein a node between the cathode of the diode and the DC-cut capacitor is connected to a switching control terminal of a synchronous rectifier.

19. A switching electric source device according to claim 18, wherein the synchronous rectifier includes a MOSFET.

20. A switching electric source device according to claim 15, wherein the secondary rectifying smoothing circuit includes a synchronous rectifier and the synchronous rectifier control circuit detects the resonance state generated based on the exciting energy of the primary winding after the main switching element switches off, and causes the synchronous rectifier to switch on earlier during the time period from the completion of the resonance state to the switching on of the main switching element, based on the detection signal for the resonance state.

* * * * *